United States Patent
Hammen et al.

(10) Patent No.: US 7,220,703 B2
(45) Date of Patent: *May 22, 2007

(54) TETHERED POLYMER LIGANDS

(75) Inventors: Richard F. Hammen, Missoula, MT (US); John P. Hammen, Missoula, MT (US)

(73) Assignee: Hammen Corporation, Missoula, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 10/774,344

(22) Filed: Feb. 6, 2004

(65) Prior Publication Data

US 2004/0224843 A1 Nov. 11, 2004

Related U.S. Application Data

(63) Continuation of application No. 09/780,131, filed on Feb. 9, 2001, now Pat. No. 6,689,715.

(60) Provisional application No. 60/181,409, filed on Feb. 9, 2000.

(51) Int. Cl.
*B01J 20/02* (2006.01)

(52) U.S. Cl. .................. 502/405; 502/415; 502/402

(58) Field of Classification Search ............... 502/405, 502/402, 415
See application file for complete search history.

(56) References Cited

U.S. PATENT DOCUMENTS

| | | | |
|---|---|---|---|
| 3,808,125 A | 4/1974 | Good | |
| 3,878,092 A | 4/1975 | Fuller | |
| 5,240,602 A * | 8/1993 | Hammen | 210/198.2 |
| 5,268,097 A | 12/1993 | Girot et al. | |
| 5,470,463 A | 11/1995 | Girot et al. | |
| 5,599,453 A | 2/1997 | Girot et al. | |
| 6,235,340 B1 * | 5/2001 | Lee et al. | 427/2.12 |
| 6,319,674 B1 * | 11/2001 | Fulcrand et al. | 435/7.1 |

* cited by examiner

*Primary Examiner*—Ling-Sui Choi
*Assistant Examiner*—Rip A. Lee
(74) *Attorney, Agent, or Firm*—Morgan Lewis & Bockius LLP; Richard F. Trecartin

(57) ABSTRACT

This invention relates to improved porous solid supports for chromatography and catalysis. The supports are prepared by covalently binding a tether polymer to a solid support, and then blocking the remainder of the support surface with a blocking reagent. The tethered polymer ligands are then covalently bound to the support by graft polymerization reactions.

26 Claims, 3 Drawing Sheets

Polyacrolein Silica from Graft Polymerization
of Acroein onto Polybutadiene Silica

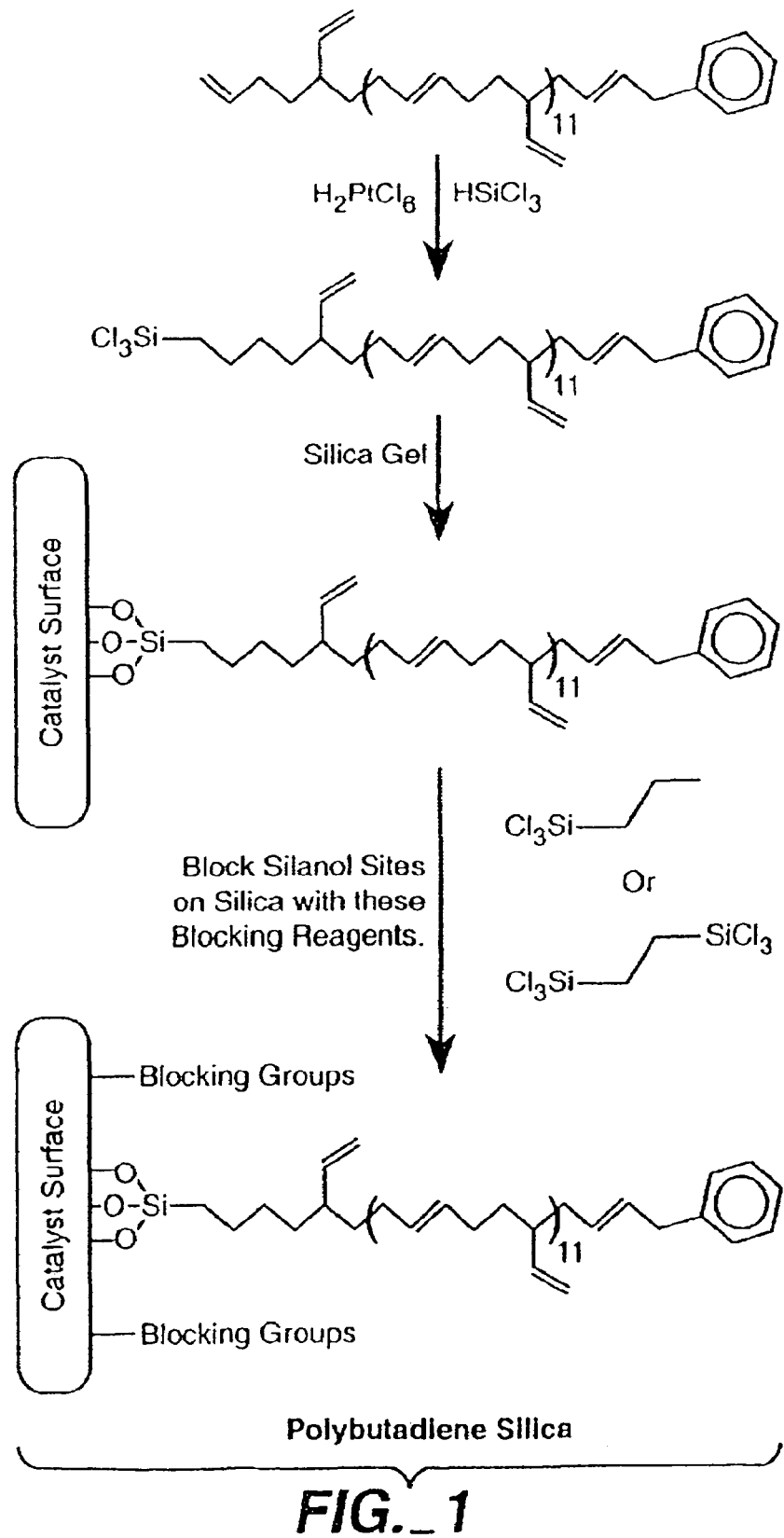
FIG._1

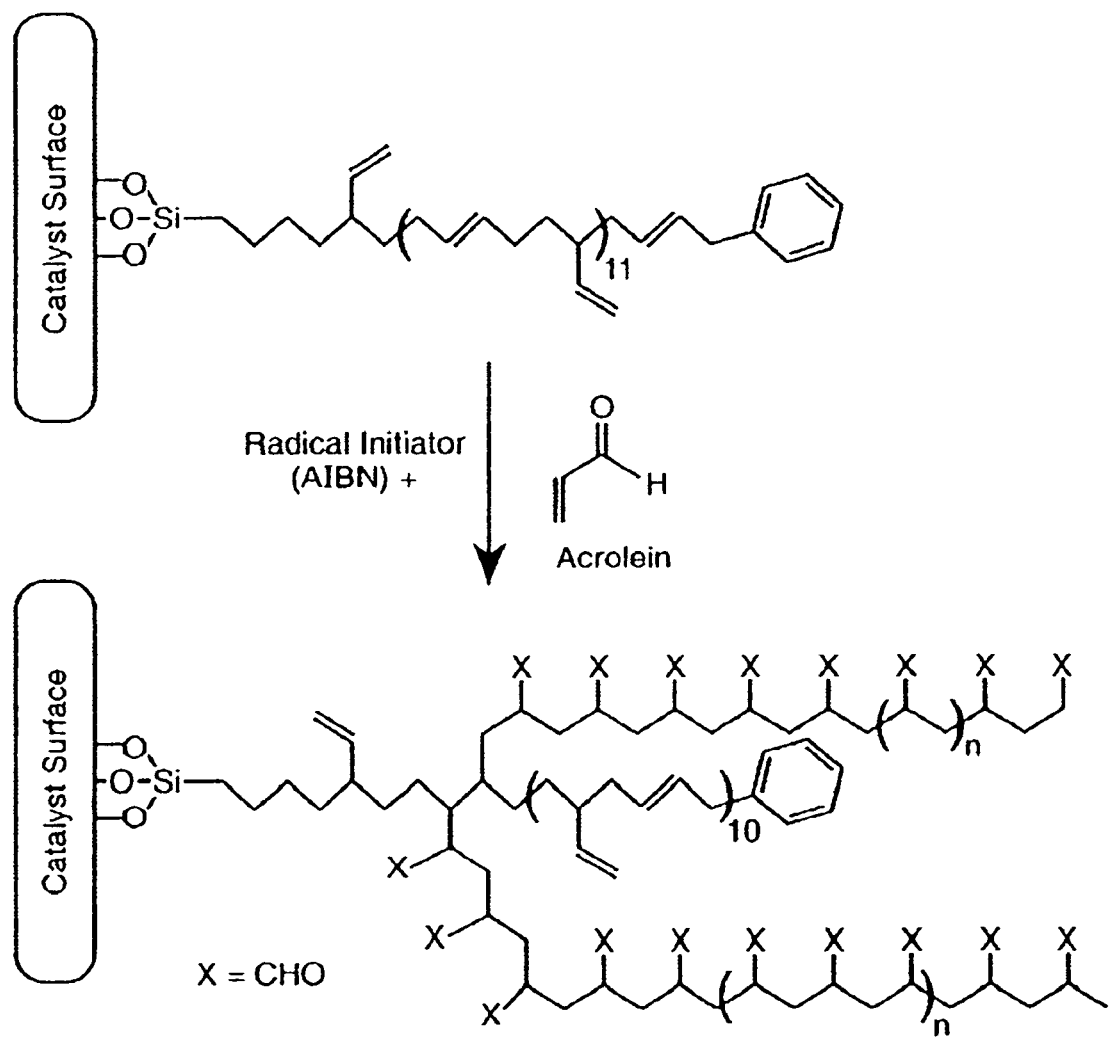
FIG._2
Polyacrolein Silica from Graft Polymerization of Acroein onto Polybutadiene Silica

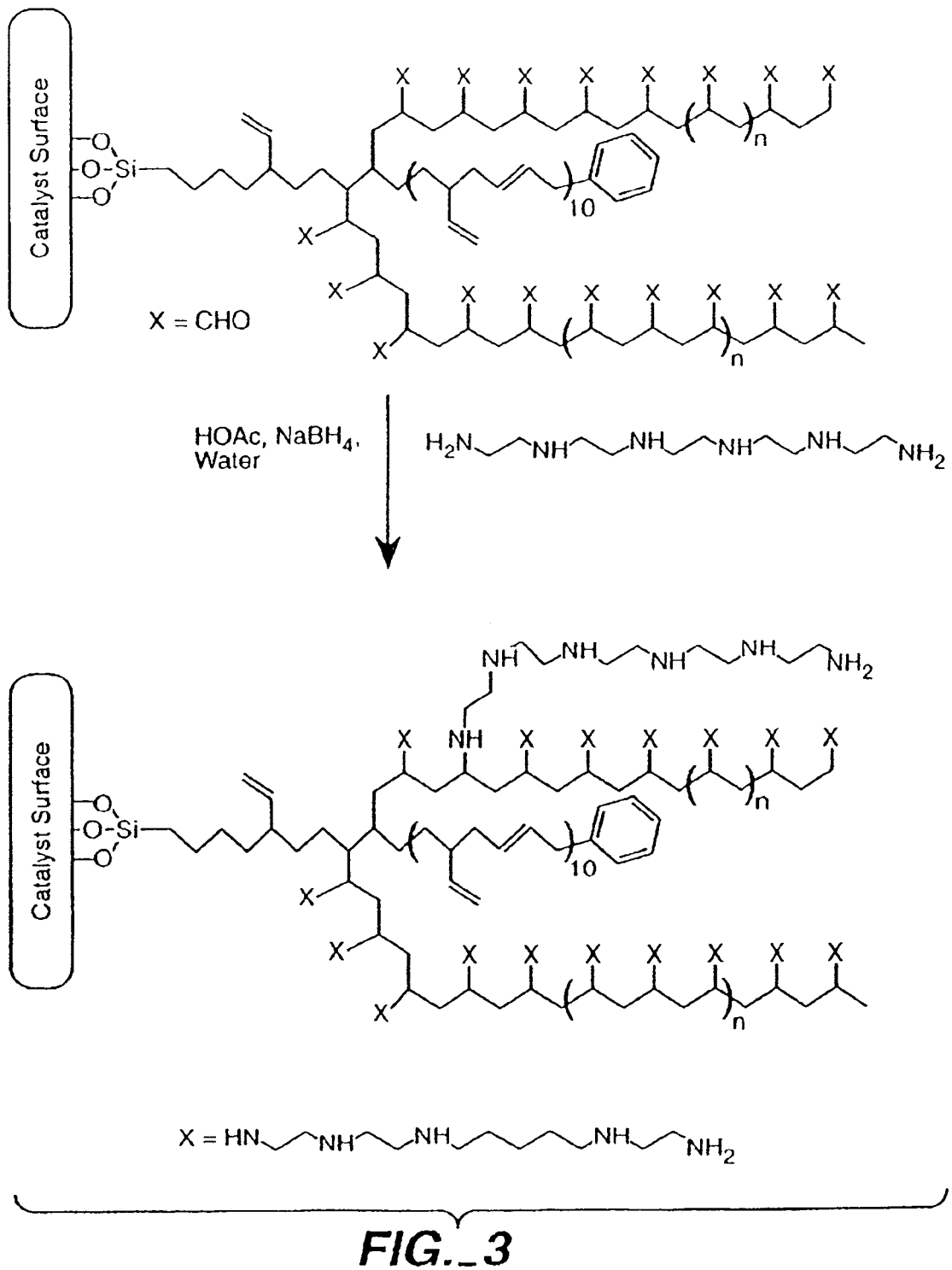
FIG._3

TETHERED POLYMER LIGANDS

This application is a continuation of Ser. No. 09/780,131, filed on Feb. 9, 2001, now U.S. Pat. No. 6,689,715, which claims benefit of U.S. Provisional Application No. 60/181,409, filed on Feb. 9, 2000.

FIELD OF THE INVENTION

The present invention relates in general to modified solid supports and processes for the preparation of same. In particular, porous supports are disclosed which are characterized by a reversible high sorptive and binding capacity and are substantially accompanied by a nonspecific adsorption or interaction with of solutes with the surfaces of the supports. The fields of molecular separations, catalysis, and solid supported chemical synthesis make use of interactions at the solid-liquid interfaces of heterogeneous support systems. Desirable characteristics of porous supports solid include high physical rigidity, high ligand density, high chemical stability, high ligand reactivity, and rapid exchange and reaction kinetics. The development of the field of porous chromatography and catalyst supports can be described as a search for heterogeneous interactions that are predictable and occur with kinetics and yields that approach the analogous reactions in solution. Solid porous supports developed previously do not approach this goal, and it is the purpose of this invention to prepare solid supports with improved performance. The modified porous supports of the present invention may also be used advantageously in high flow, high efficiency mass transfer chromatographic and catalytic processes, which may be carried out in fluidized bed, packed bed, or stirred reactor mode of operation.

BACKGROUND OF THE INVENTION

General Considerations

The general purpose of chromatographic and ion exchange separations is to isolate a molecule or ion from solution and from other species. Chromatographic and ion exchange separations occur by contacting a solution with a solid support that has a surface with defined chemical characteristics. The separation occurs by partitioning of the solutes between the solution and the solid phase, which occurs because the surface of the support interacts selectively with a desired solute molecule or class of solute molecules, and the desired solutes are adsorbed. Passage of a solution through a bed or column of the solid support results in retardation of the adsorbed molecules and, thereby, separation of the desired compounds from others. The effectiveness and selectivity of the separation process is a function of several factors. These factors include the relative affinities of the solutes for the surface and the extent to which equilibration of a solute between solution and the solid phase reaches equilibrium.

The technology and science of chromatographic supports is imperfect, and existing products are a result of trade offs of a support design parameters. The capacity of a solid support is a function of the surface area of the support particles. The surface area of porous particles is inversely related to the pore size of the particles. Small pore diameters relate to increased surface area, and the number of functional groups available to interact with the desired solute molecules. This is referred to as capacity. Unfortunately, porous particles with small pore sizes and large surface areas are not very permeable to the flow of solutes in and out of the pores, where the adsorption occurs. Recognition of this fact has stimulated development of particles with larger pore diameters that are more permeable to solution flow. More importantly, the larger pores permitted the chromatography of macromolecules, such a proteins. The tradeoff suffered with the increased pore diameters is reduced surface area, and proportionately lower capacity. In addition to the pore size, surface area, and capacity issues that require compromises in support design, all conventional chromatographic supports and catalysts suffer from sluggish adsorption-desorption kinetics that result from slow diffusion of solute molecules through the stagnant boundary layer at the solid-liquid interface.

Previous Efforts of Solid Support Improvement

Girot and Boschetti (U.S. Pat. No. 5,559,453) disclose modified porous supports for chromatography biomolecules. The support is prepared by use of a passivation mixture, comprising a main monomer, a passivating monomer, and a cross linking agent, which mixture upon polymerization results in the substantial elimination of the undesirable nonspecific interaction with biomolecules. The matrix is prepared by first adsorption of various bifunctional compounds to the support surface. The bifunctional molecules, called the passivating monomers, adsorb by virtue of charge interactions and/or hydrogen binding to the silanol surface of the porous support. The passivating monomers include diethylaminoethyl methacrylamide and methacrylamidopropyl trimethyl ammonium chloride, which are cationic at pH>7.0, and will form ion pairs with the deprotonated silanol surface. The result of adsorbing the passivating monomer, is that the surface becomes coated with the passivating monomer and the copolymerizable vinyl group of the molecule is oriented toward the solution in contact with the surface. The polymerization mixture, containing a functional monomer, a crosslinking agent, an initiator, and a porogen is then permitted to polymerize in the pore of the support to form a highly crosslinked gel structure, or the so-called gel in a shell. It is probable that the passivating monomer copolymerizes with the other monomers provided, resulting covalent bonds between the passivating layer and the support. The porogen is necessary to provide pores or channels for solution and analyte molecules to flow through the gel at an acceptable pressure differential and velocity. After completion of the polymerization, the support is washed to remove unreacted monomers and porogen.

Although the passivated porous supports have good properties and have achieved commercial acceptance, there are some underlying design flaws in these materials that limit their performance. The first problem is the noncovalent association of the passivating monomer with the porous support. It is highly unlikely that all of the passivating monomers are incorporated in the polymer formed inside the pores. The result of this is that the passivating monomer is subject to leaching under changes in mobile phase pH changes. Leaching of the passivating surface coating can lead to patches of silanol surface that have no protective coating. This in turn will cause nonspecific binding with proteins that are well know to interact with silanol surfaces. The second design flaw of the passivated porous supports is the crosslinking density of the gel inside the pores. The highly crosslinked copolymer does not permit facile flow of solution through the pores, and it is necessary to use porogens to create micro channels that permit fluid exchange to occur. Such a gel structure will not have the optimal flow characteristics and exchange kinetics.

SUMMARY OF THE INVENTION

It is the objective of this invention to provide porous supports with tethered polymer ligands that have surprisingly high levels of sorptive capacity and unprecedented low levels of nonspecific binding and stability against solvolysis. The present invention comprises material having interior and exterior surfaces that are covered by a polymer network. The material is prepared by (1) covalently binding a tether molecule to a support material, (2) blocking the remaining surface of the support with a reagent that confers stability against solvolytic attack or other nonspecific binding interactions, and (3) then grafting or binding a polyfunctional polymer to the immobilized tether. The polyfunctional polymer contains functional or reactive groups that are of utility for chromatographic separations, for chemical synthesis, and for catalysis of reactions.

BRIEF DESCRIPTION OF THE DRAWINGS

FIG. 1 depicts the formation of polybutadiene silica.

FIG. 2 depicts the polymerization of acroein onto polybutadiene silica.

FIG. 3 depicts the addition of pentaethylene hexamine to polyacroein silica.

EXAMPLES

Example 1

Preparation of 30 Micron 4000 Angstrom Porous Bromopropyl Silica

Silica gel (Machnery Nagel, 30 micron, 4000 Angstrom pores, 100.7 g) was placed in a 500 ml round bottom flask and dried in an oven controlled at 150° C. for 12 hours. The flask was removed from the oven, stoppered, and cooled to room temperature. Pyridine (403 ml) and 16.0 ml of trichlorobromopropyl silane (Petrarch) was added in three portions with vigorous swirling of the flask between additions. The flask was then agitated by rotation for 12 hours at room temperature. The reaction mixture was filtered on a coarse fritted glass funnel and washed three times each with 100 ml portions of methanol, ether, methanol, and ether. After the ether wash, the resultant bromopropyl silica gel was dried by suction on the funnel for 1 hour. It was then dried in an oven at 100° C. for 2 hours.

Example 2

Preparation of 30 Micron 4000 Angstrom Porous PEG 600-Propyl-Silica

Bromopropyl silica (101.0 g), prepared by the method of Example 1 and 404 ml of polyethylene glycol 600 (PEG 600) were added to a 1000 ml round bottom flask. In a separate flask, 0.20 g of sodium hydride (80% suspension in mineral oil) was added to 6 ml of anhydrous dioxane. The dioxane suspension was added to the suspension of silica in the polyethylene glycol. The flask was swirled until evolution of hydrogen gas had ceased. The flask was connected to a vacuum source and degassed until all bubbling had ceased. The flask was then stoppered and spun for 30 minutes while heating to 120 deg in an oil bath. The flask was degassed again, and then spun for 5.5 hours while heating to 120 deg in an oil bath. The flask was cooled to room temperature and the reaction mixture was filtered on a coarse fritted glass funnel and washed three times each with 500 ml portions of methanol, water, methanol, and ether. After the ether wash, the resultant PEG 600-propyl-silica gel was dried by suction on the funnel for one hour.

Example 3

Oxidation of 30 Micron 4000 Angstrom Porous PEG 600-Propyl-Silica to Aldehyde Functionality The polyethylene glycol substituted silica (100 grams), prepared as in Example 2, was added to a one liter round bottom flask. Dimethyl sulfoxide (400 ml) was added to the silica. The flask was connected to a vacuum source and degassed until all bubbling had ceased. Acetic anhydride (20.0 ml) was added in the flask. The flask was connected to a vacuum source and degassed until all bubbling had ceased. The flask was spun overnight and the reaction mixture was filtered on a coarse fritted glass funnel and washed three times each with 500 ml portions of methanol and ether. After the ether wash, the resultant aldehyde-PEG 600-propyl-silica gel was dried by suction on the funnel for one hour.

Example 4

Graft Polymerization of Allyl Bromide to PEG-Propyl Silica Gel

The aldehyde-PEG 600-propyl-silica gel prepared in Example 3 was pressure packed into a 4.6×100 mm high pressure liquid chromatography (HPLC) column. A solution of 1.0 molar allyl bromide and the radical initiator, 0.038 molar azobisisobutyronitrile (AIBN), in benzene was injected into the column and the ends of the columns were plugged. The column was immersed in a 78 degree water bath for 21 hours at 68 deg C. to perform a graft polymerization reaction. The reaction was terminated by removing the column from the bath and flushing it with isopropanol.

Example 5

Reaction of Pentaethylene Hexamine with Polyallyl Bromide-PEG-Propyl Silica Gel

A solution of pentaethylene hexamine (1.0 molar) in isopropanol was prepared. The solution was injected with the syringe into the HPLC column prepared in example 4. The ends of the column were stoppered and column was placed in the 68 degree water bath for one hour. A second injection of the pentaethylene hexamine solution into the column was then made, and the column was placed in the water bath for one more hour to complete the reaction. The reaction was terminated by flushing the column with isopropyl alcohol.

Example 6

Measurement of Copper Binding Capacity of the Polypentaethylene Hexamine Column Prepared in Example 5

The column was plumbed into a quaternary gradient HPLC and equilibrated by pumping the following solutions through the column:
10 ml of 1.0 normal sulfuric acid
2 ml of deionized water
10 ml of 0.1 molar ammonia
2 ml of deionized water A 0.01 molar copper sulfate solution (pH 4.1) was pumped through the column at a flow rate of 2.0 ml/minute. The effluent of the column was monitored by a UV-visible HPLC optical absorbance detector set at 799 nm. The analog signal from the detector was digitized and collected in a time vs. absorbance (actually microvolts) data file. The feed solution was pumped through the column until the copper saturated the media and appeared in the effluent stream. The loading was then terminated, and the column was rinsed with water, eluted with 1.0 normal sulfuric acid, and reequilibrated with base and water. The capacity of the column, based upon the quantity of copper adsorbed to the midpoint of the uptake curve was ~60 umoles copper/gram of silica.

Example 7

Preparation of Polybutadiene Silica (PBD-Silica)

Phenyl terminated polybutadiene 1300 (PBD, Aldrich Chemicals, 45% vinyl) was reacted with trichlorosilane (TCS) with chloroplatinic acid ($H_2PtCl_6$) catalysis to produce a TCS derivative of the PBD. The resulting TCS-PBD was mixed with a slurry of silica gel (Crossfield catalyst support, 105 microns particle size, 250 Angstrom average pore diameter, 250 $m^2$/gram surface area) in dry toluene for 24 hours. The quantity of trichlorosilane used was 2 moles/mole of polybutadiene. Pyridine (1.2 equivalents/Cl) was added to scavenge the HCl evolved from the silanization reaction. The slurry was gently shaken for 18 hours at room temperature. The surface of the silica was then blocked by addition of 1.0 mmole/gram of 1,2-Bis(trichlorosilyl)Ethane and 2 mmole/gram of pyridine to the slurry. After shaking for three hours, the reaction was worked up by vacuum filtration in a sintered glass funnel, and washing with toluene, followed by methanol. The silica was dried in the filter funnel by continued application of vacuum to the filter funnel.

Example 8

Preparation of 30 Micron 1000 Angstrom PEG 600-Propyl-Silica

Monomethoxy polyethylene glycol 580 (30 grams, 54 mmoles) was dissolved in methanol (125 ml) and sodium methoxide (4.22 gram, 78 mmoles) was added. After the sodium methoxide dissolved, allyl bromide (7 ml, 81 mmoles) was added, and the solution was stirred overnight. The solution was reduced to an oil by evaporation on a rotary evaporator, and the oil was redissolved in 150 ml of toluene. The toluene solution was filtered to remove the sodium chloride precipitate, and the solvent was evaporated to yield allyl methoxy polyethylene glycol.

Example 9

Reaction of Allyl Methoxy Polyethylene Glycol with Trichlorosilane

Allyl methoxy polyethylene glycol (40.2 grams, 68 mmoles) was dissolved in 88 ml of toluene in a round bottom flask under nitrogen. A solution of 0.01 molar chloroplatinic acid in tetrahydrofuran (2.5 ml) was added, followed by trichlorosilane (6.2 ml, 61 mmoles). The solution was stirred 10 hours at room temperature. The flask was heated to 55 deg, using an oil bath, for 2 hours, then the solution was stored under a nitrogen atmosphere at −20 degrees.

Example 10

Preparation of Silica Gel with Covalently Bound Polyethylene Glycol

Silica gel (Amicon, 30 micron, 1000 Angstrom pores, 50.0 g) was placed in a 500 ml round bottom flask and dried in an oven controlled at 150° C. for 12 hours. The flask was removed from the oven, stoppered, and cooled to room temperature. Toluene (213 ml) and 12.0 ml of the silane reagent from Example 9 were added. The flask was then agitated by rotation for 24 hours at room temperature. The surface was blocked by reaction with trichlorosilylpropyl methoxy ethylene glycol for three hours at room temperature. The reaction mixture was filtered on a coarse fritted glass funnel and washed three times each with 100 ml portions of methanol, ether, methanol, and ether.

Example 11

The Silica Gel from Example 10 was Pressure Packed into a 0.46×10 cm HPLC Column and the Ends were Plugged with HPLC End Fittings A 0.2 molar solution of acrylic acid was prepared in water and degassed by bubbling nitrogen through it for 30 minutes. An initiator, 2,2'-Azobis (2-methylpropioniamidine) dihydrochloride, was added at a concentration of 1.0 mole percent, relative to the acrylic acid. The solution was injected into the column with a syringe and the column ends were plugged. The column was placed in a hot bath to graft polymerize the acrylic acid to the solid support.

Example 12

Preparation of Polyacrolein Silica

Acrolein was graft polymerized with the PBD silica that had been blocked with 1,2-bis(trichlorosilyl)ethane by the following procedure. The PBD silica was packed into a 4.6×100 mm high pressure liquid chromatography (HPLC) column. A 1.0 molar solution of acrolein and 0.025 molar radical initiator, 2,2'-azobis(2-methylpropioniamidine) dihydrochloride, in water was injected into the column and the ends of the columns were plugged. The column was immersed in a 78 degree water bath for 2 hours at 78 deg C. to perform the graft polymerization reaction. The reaction and structures are shown in FIG. 2.

Example 13

Reductive Amination of Polyacrolein Silica with Pentaethylene Hexamine

Polyacrolein silica from Example 9 was packed into an HPLC column and a solution of 1 molar pentaethylene hexamine and 0.1 M acetic acid in anhydrous ethanol was injected into the column. After 2 hours of reaction, a 0.6 M sodium borohydride solution in anhydrous ethanol was injected into the column. After 1 hour of reaction, the unreacted reagents were flushed from the column and the resulting polypentaethylene hexamine silica was measured for its metal adsorption capacity. The reaction is shown in FIG. 3. The capacity of the column, based upon the quantity of copper adsorbed to the midpoint of the uptake curve was ~800 umoles copper/gram of silica.

Example 14

Alkylation of Polypentaethylene Hexamine Silica with Ethylene Sulfide

A 1.0 molar solution of ethylene sulfide in methanol was injected into a column of polypentaethylene hexamine silica that had been prepared as in Example 10. After one-hour reaction, a second injection of the 1.0 molar ethylene sulfide solution was made into the column, and the reaction was allowed to proceed for one hour. The unreacted reagents were then flushed out the column and the column was tested for its metal adsorption capacity. The capacity of the column, based upon the quantity of copper adsorbed to the midpoint of the uptake curve was ~325 umoles copper/gram of silica.

What is claimed is:

1. A support comprising (i) a porous noncompressible solid material, (ii) a tether polymer covalently bound to the solid material that is amenable to grafting with other polymers, and (iii) a protective polymeric surface covering that reduces nonspecific interactions of solutes with said solid material, and (iv) a functional polymer or copolymer grafted to the tether polymer and possessing useful chemical functionality.

2. The support of claim 1 having sorptive capacity.

3. The support of claim 2 having reversible sorptive capacity.

4. The support of claim 1 further comprising chemical stability on exposure to strong acidic or alkaline medium.

5. The support of claim 1 that is substantively devoid of nonspecific binding of proteins and other biomacromolecules to the surface of said solid.

6. The support of claim 1 in which said material is silica.

7. The support of claim 1 in which said material is alumina.

8. The support of claim 1 in which said material is polystyrene.

9. The support of claim 2 in which said materials is silica.

10. The support of claim 1 in which the material is a silica membrane.

11. The support of claim 1 in which the material is an alumina membrane.

12. The support of claim 1 in which the material is a polymer membrane.

13. The support of claim 1 in which said functional polymer or copolymer is prepared by polymerization of vinyl monomers.

14. The support of claim 13 in which said functional polymer or copolymer is prepared by polymerization of vinyl monomers in the presence of a polymerization initiator.

15. The support of claim 13 in which said functional polymer or copolymer is prepared by polymerization of vinyl monomers in the presence of a polymerization initiator selected from the group consisting of persulfate/tertiary amine, persulfate and a transition metal, nitrites, azo compounds, and photochemical initiators.

16. The support of claim 13 in which said functional polymer or copolymer is prepared by polymerization of vinyl monomers initiated by radiant energy.

17. The support of claim 1 in which the protective polymeric surface is prepared by reaction of said material with trihalo or trialkoxy silane reagents.

18. The support of claim 1 in which the tether polymer is bound to the material by reaction of said material with trihalo or trialkoxy silane reagents.

19. The support of claim 1 in which the tether polymer is bound to said material by reaction of said material with trihalo or trialkoxy silane reagents, said silane reagents having functional groups selected from the group consisting of polybutadiene, polyethylene glycol, polyvinyl alcohol, polypropylene glycol.

20. The support of claim 1 in which the protective polymeric surface covering is prepared by reaction of said material with trihalo or trialkoxy silane reagents, said silane reagents having functional groups selected from the group consisting of 2-trichlorosilylethyl, methoxy propyl ethylene glycol, substituted ethylene glycols, and alkyl.

21. The support of claim 1 in which said functional polymer or copolymer has cation exchange functionality.

22. The support of claim 1 in which said functional polymer or copolymer has anion exchange functionality.

23. The support of claim 1 in which said functional polymer or copolymer has metal binding functionality.

24. The support of claim 1 in which said functional polymer or copolymer has metal chelating functionality.

25. The support of claim 1 in which said grafted functional polymer or copolymer has selective functional groups attached to the polymer or copolymer chain that selectively adsorbs molecules or ions from solutions in contact with the solid support.

26. The support of claim 1 in which said grafted functional polymer or copolymer has functional groups useful for initiating solid supported syntheses.

* * * * *